United States Patent
Chang et al.

(10) Patent No.: US 6,286,097 B1
(45) Date of Patent: Sep. 4, 2001

(54) COMPUTER CHIPSET FOR ACCESSING A CONVENTIONAL READ ONLY MEMORY (ROM)

(75) Inventors: Nai-Shung Chang, Yung-Ho; Yung-Hui Chen; Hui-Li Chou, both of Taipei, all of (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/267,881

(22) Filed: Mar. 11, 1999

(30) Foreign Application Priority Data

Aug. 6, 1998 (TW) ................................................ 87112950
Aug. 6, 1998 (TW) ................................................ 87112951

(51) Int. Cl.[7] ............................. G06F 9/445; G06F 12/00
(52) U.S. Cl. ................................. 713/2; 711/102; 711/165
(58) Field of Search ........................... 713/1, 2; 710/62, 710/63, 64, 10; 711/102, 154, 165

(56) References Cited

U.S. PATENT DOCUMENTS

| | | | |
|---|---|---|---|
| 5,603,055 | * | 2/1997 | Evoy et al. ................................ 713/2 |
| 5,802,550 | * | 9/1998 | Fullam et al. ......................... 711/102 |
| 6,058,474 | * | 5/2000 | Baltz et al. ................................ 713/1 |
| 6,081,852 | * | 6/2000 | Baker ...................................... 710/24 |
| 6,173,398 | * | 1/2001 | Kim .......................................... 713/2 |

* cited by examiner

Primary Examiner—Do Hyun Yoo
Assistant Examiner—Gary J. Portka
(74) Attorney, Agent, or Firm—Jiawei Huang; J.C. Patents

(57) ABSTRACT

A computer chipset having reduced peripheral pins for accessing a conventional ROM in a computer system is disclosed. There is a switching circuit within the chipset. When the computer is turned on, a booting control circuit activates a booting enabling signal, so that booting programs can be accessed from the ROM through the switching circuit and are executed in a main processor. Subsequently, contents stored in the ROM are moved to a main memory and the booting enabling signal is inactivated by the booting control circuit to allow a peripheral control circuit to communicate with peripheral devices. In this way, chipset having a low pin count (LPC) interface circuit can share the peripheral pins of the chipset to access the conventional ROMs, so that the production costs can be reduced.

17 Claims, 7 Drawing Sheets

COMPUTER CHIPSET FOR ACCESSING A CONVENTIONAL READ ONLY MEMORY (ROM)

CROSS-REFERENCE TO RELATED APPLICATION

This application claims the priority benefit of Taiwan application Serial No. 87112950, and No. 87112951 filed Aug. 6, 1998, the full disclosure of which is incorporated herein by reference.

BACKGROUND OF THE INVENTION

1. Field of Invention

The present invention generally relates to a computer chipset, and more particularly to a chipset for accessing a read only memory (ROM).

2. Description of Related Art

Computers are getting more and more popular, while their size and price are significantly reduced, thanks to the advancement of semiconductor technologies.

FIG. 1 is a block diagram showing an architecture of a conventional computer system 100, in which a main processor 110, a chipset 120, a main memory 130, a peripheral device 140, and a read only memory (ROM) 150 for storing booting programs for the computer system 100, are depicted. Note that the main processor 110 includes a central processing unit (CPU) and CPU-related circuits. The chipset 120 is used to integrate control circuits in the computer system 100. The main processor 110 accesses the main memory 130 and communicates with the peripheral device 140 with the aid of the chipset 120 within the computer system 100. The main memory 130 includes memories and their related control circuits. The main memory 130, typically dynamic random access memory (DRAM) because of its higher capacity and lower price, is used to store programs and data used by the main processor 110. The peripheral device 140 includes various peripheral devices which can be connected to the computer system 100, such as hard disk drives (HDD), floppy disk drives (FDD), devices connected to a RS232 interface, and printers, etc.

The ROM 150 not only stores the booting programs, but also programs of the basic input output systems (BIOS) for the computer system 100. When the computer system 100 is turned ON or reset, the main processor 110 will access the ROM 150 to boot the computer system 100. Over the past few years, the accessing speed of DRAMs has been significantly improved thanks to the advancement of semiconductor technologies. The enhancement of ROMs, however, is not so impressive. Therefore, there is a gap in accessing speed between the DRAMs and ROMs.

The BIOS programs stored in the ROM 150 within the computer system 100 need to be called frequently. Unfortunately, performance of the computer system 100 is generally deteriorated because of the low accessing speed of the ROM 150. Therefore, it has become a common practice to move the programs stored in the ROM 150 to the main memory 130 once the computer system 100 is booted. The programs in the main memory 130, instead of the ROM 150, will be called to increase the operating efficiency as long as the computer system 100 is in operation.

As shown in FIG. 1, where the computer system 100 accesses contents of the ROM 150 through an industrial standard adapter (ISA) interface 125, which is integrated within the chipset 120. In the early stage, personal computers used to access various peripheral devices only through the ISA interface 125. With more complete specifications for computer interface developed, such as a peripheral component interconnect (PCI), the ISA interface 125 has gradually become obsolete. In another aspect, although a chipset can be designed to provide more functions, it can not, however, provide enough pins to perform these functions due to the size constraint of the chipset itself. Especially, the less functional ISA interface occupies excessive pins from the chipset, which is against the trend for demanding a smaller size for an electronic component. Therefore, the computer industry is now considering to totally abandon the ISA interface. Instead, a new interface of low pin count (LPC), which only uses 8 pins, is proposed to replace the ISA interface. Although the LPC interface takes fewer pins from the chipset, it does cause a problem. That is, the ROMs for storing the BIOS programs to boot the computer system need to be redesigned accordingly if the LPC interface is used.

FIG. 2 is a block diagram showing an architecture of a conventional computer system using a LPC interface in a chipset to access a ROM. As shown in FIG. 2, when a computer system 200 is turned on, booting programs in a ROM 250 will be accessed and executed in a main processor 210. The contents of the ROM 250 will then be moved to a main memory 230 through a LPC interface 225 within a chipset 220. Therefore, the LPC interface 225 within the chipset 220 possesses the same functions as those of the ISA interface in FIG. 1.

Although the LPC interface 225 occupies less peripheral pins, it can not, however, connect to conventional ROMs, which are widely used so far. An interface circuit for ROMs needs to be designed to connect to the LPC interface 225 within the chipset 220. Unfortunately, ROMs with a LPC interface are not available now. If there is any, the cost at the initial stage will be very high due to production scale or technological problems.

As a summary, the conventional architecture for accessing a ROM in a computer system has the following disadvantages:

1. An ISA interface within a chipset is required to access the booting programs stored in a conventional ROM for a computer system. The ISA interface, however, occupies excessive peripheral pins from the chipset, preventing the chipset from providing more functions for the computer system.
2. If a LPC interface built within a chipset is used to access a ROM, a LPC interface circuit for the ROM needs to be designed, which are not available so far. Even if the LPC interface for ROMs is available, the production cost of the "new" ROMs will be higher than that of the conventional ROMs, so that the products produced will not be very competitive in the market.

SUMMARY OF THE INVENTION

It is therefore an objective of the present invention to provide a chipset for accessing a conventional ROM by using pehipheral circuits, without using the conventional ISA interface. The number of peripheral pins for accessing the conventional ROM within the chipset is significantly reduced so that more functions can be provided by the chipset. Furthermore, more costly ROMs with LPC interface need not be used so that the production cost can be reduced to increase product competitiveness.

It is another objective of the present invention to provide a chip set for accessing a conventional ROM by peripheral circuits, in which signal lines of the LPC interface circuit and other interface circuits within the chipset and signal lines of the ROM share the same peripheral pins to access the ROM, so that additional peripheral pins of the chipset to access the ROM are not required.

In accordance with the foregoing and other objectives of the present invention, a computer chipset having reduced peripheral pins for accessing a conventional ROM in a computer system is provided. The computer system comprises a main processor, a ROM, a peripheral control circuit, a booting control circuit, a switching circuit, and a main control circuit. The peripheral control circuit, including a low pin count (LPC) interface circuit, is used to control various peripheral devices. The booting control circuit is used to generate a booting enabling signal to control the access to a ROM. The switching circuit has a first input-output port, a second input-output port, and a third input-output port, in which the first input-output port is coupled to the peripheral control circuit, the second input-output port is coupled to the booting control circuit, and the third input-output port is coupled to a peripheral device and the ROM. The switching circuit is controlled by the booting enabling signal so that either the first input-output port or the second input-output port is connected to the third input-output port. That is, the second input-output port is connected to the third input-output port when the booting enabling signal is activated, and first input-output port is connected to the third input-output port when the booting enabling signal is inactivated.

The main control circuit connected to both the main processor and main memory is responsible for controlling operations in the chipset. When the computer is turned on, the booting control circuit activates the booting enabling signal, so that the booting programs are accessed from the ROM through the switching circuit and are executed in the main processor. Subsequently, the contents in the ROM are moved to the main memory and the booting enabling signal is inactivated by the booting control circuit to allow the peripheral control circuit to communicate with the peripheral devices.

According to a preferred embodiment of the present invention, the switching circuit which can be implemented using, for example, metal oxide semiconductor (MOS) transistors, comprises a plurality of first electronic switches and a plurality of second electronic switches. The input-output lines from the peripheral control circuit are coupled to the peripheral pins of the chipset through the first electronic switches, while the input-output lines of the booting control circuit are coupled to the peripheral pins of the chipset through the second electronic switches. When the booting enabling signal is activated, the first electronic switches are OFF and the second electronic switches are ON. When the booting enabling signal is inactivated, the first electronic switches are ON and the second electronic switches are OFF.

According to a preferred embodiment of the present invention, the peripheral control circuit comprises a hard disk drive (HDD) control circuit, a serial control circuit, a printer control circuit, a floppy disk drive (FDD) control circuit, a power management circuit, a LPC interface circuit, and other peripheral control circuits.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
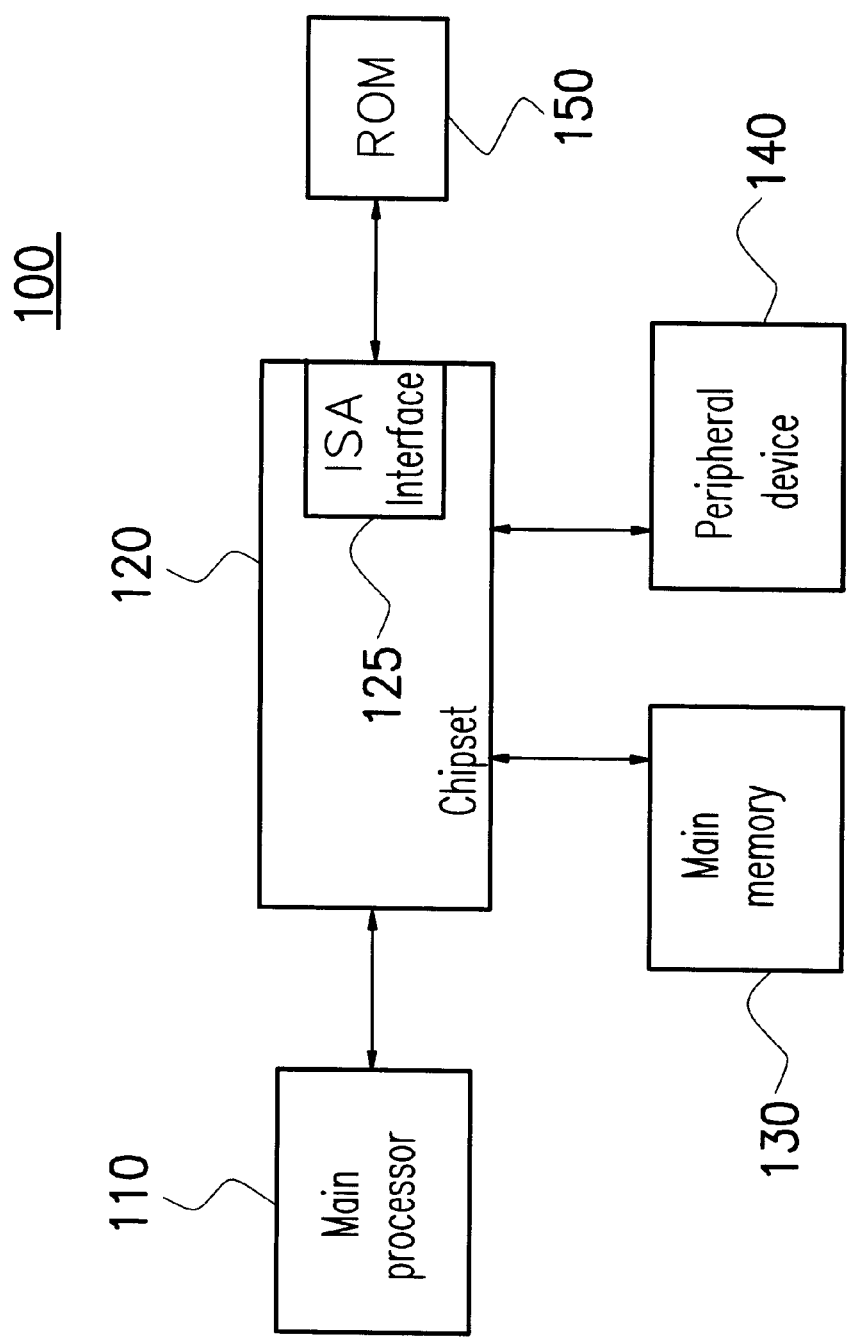
FIG. 1 is a block diagram showing an architecture of a conventional computer system.
Figure 2:
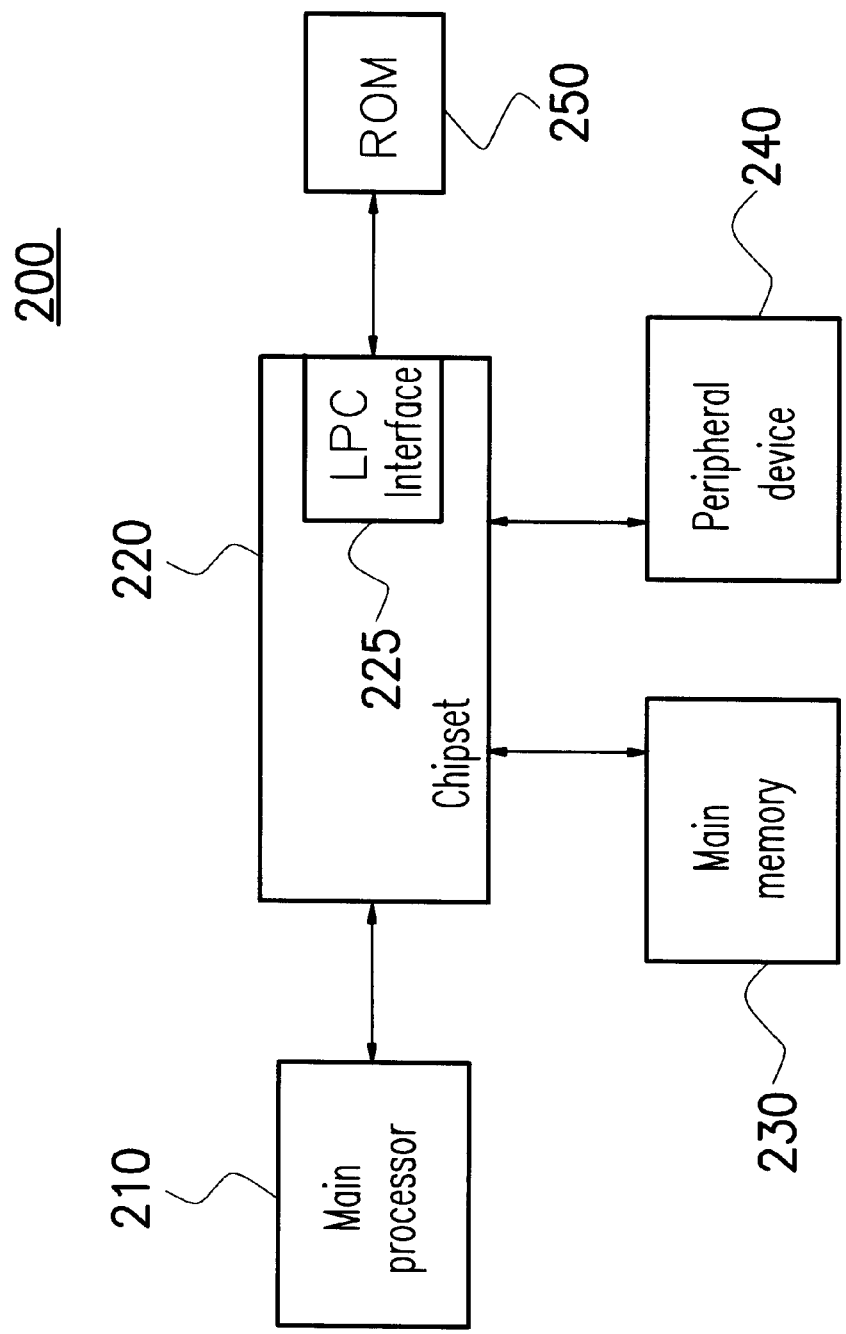
FIG. 2 is a block diagram showing an architecture of a conventional computer system having a LPC interface within a chipset to access a ROM.

Reference will now be made in detail to the present preferred embodiments of the invention, examples of which are illustrated in the accompanying drawings. Wherever possible, the same reference numbers are used in the drawings and the description to refer to the same or like parts.

Figure 3:
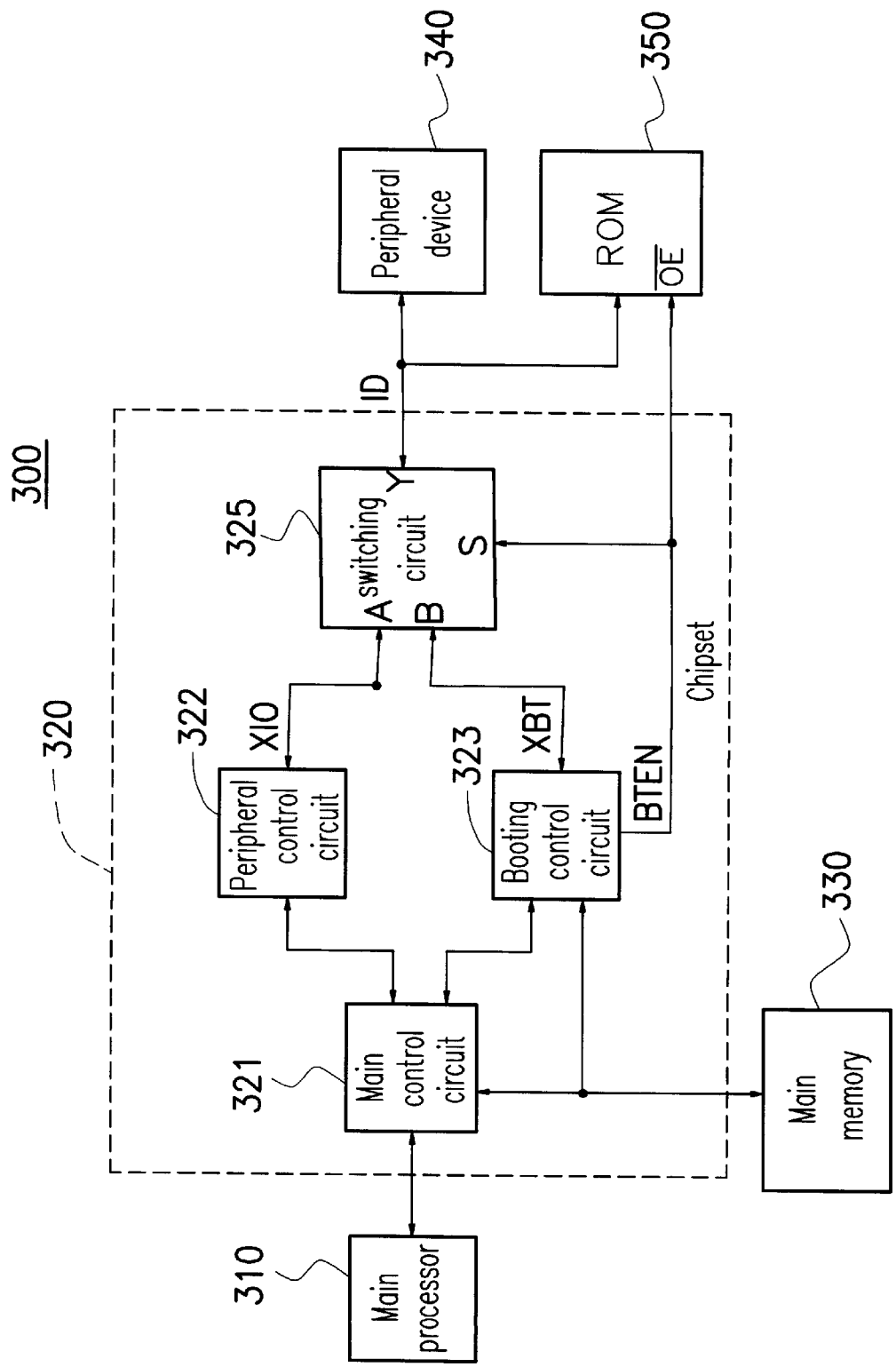
FIG. 3 is a block diagram of a computer system having a chipset with reduced peripheral pins to access a conventional ROM according to a preferred embodiment of the present invention.

Refer to FIG. 3, where a block diagram of a computer system having a chipset with reduced peripheral pins to access a conventional ROM is depicted according to a preferred embodiment of the present invention. As shown in FIG. 3, a computer system 300 comprises a main processor 310, a chipset 320, a ROM 350, a peripheral device 340, and a main memory 330. The main processor 310 is the heart of the computer system 300, responsible for executing programs for the computer system 300. Note that the main processor 310 includes a central processing unit (CPU) as well as CPU-related circuits. The chipset 320 is used for integrating control circuits in the computer system 300. The main processor 310 can access the main memory 330 and communicate with the peripheral device 340 with the help from the chipset 320. The main memory 330 includes memories and their related control circuits. The main memory 330, generally DRAM because of its higher capacity and lower price, is used to store programs and data used by the main processor 310. The peripheral device 340 includes various peripheral devices in a computer system, such as hard disk drives (HDD), floppy disk drives (FDD), devices connected to a RS232 interface, and printers, etc.

The ROM 350 not only stores the booting programs, but also programs of the basic input output systems (BIOS) for the computer system 300. When the computer system 300 is turned ON or reset, the main processor 310 accesses the programs stored the ROM 350 to boot the computer system 300. After the system is booted, contents in the ROM 350 are moved to the main memory 330. By executing a shadow program which maps the addresses of the ROM 350 to the main memory 330, accessing to the ROM 350 is no longer required during the operation of the computer system 300.

During a circuit design, practical circuits of the computer chipset might be slightly different from those described in the present invention due to circuit complexities involved and other considerations. However, for the illustrating purpose, circuits not directly linked to the present invention within the chipset will not be shown or will be simplified by using a representative block.

To achieve the objective of moving the programs in the ROM 350 to the main memory 330, the chipset 320 further comprises a main control circuit 321, a peripheral control circuit 322, a booting control circuit 323, and a switching circuit 325. As shown in FIG. 3, the main control circuit 321 connected to the main processor 310 and main memory 330 is responsible for controlling operations of the chipset 320, including controlling the peripheral control circuit 322 and the booting control circuit 323.

The switching circuit 325 comprises a selection input S, which receives a booting enabling signal BTEN to decide whether an input-output port A or an input-output port B is connected to an input-output port Y. When the booting enabling signal BTEN is activated, for example, at a low potential, the input-output port B is connected to the input-output port Y of the switching circuit 325. When the booting enabling signal BTEN is inactivated, for example, at a high potential, the input-output port A is connected to the input-output port Y of the switching circuit 325.

Note that the input-output port Y of the switching circuit 325 is connected to a peripheral pin of the chipset 320, which then connects to the ROM 350 and the peripheral device 340. Also, the input-output line XIO of the peripheral control circuit 322 is connected to the input-output port A of the switching circuit 325, while the input-output line XBT of the booting control circuit 323 is connected to the input-output port B of the switching circuit 325. The booting control circuit 323 generates a booting enabling signal BTEN to control both the switching circuit 325 and an output enabler OE of the ROM 350. Contents in the ROM 350 can only be accessed when the output enabler OE of the ROM 350 is activated.

From the above-mentioned descriptions, when the computer system 300 is turned ON, the booting control circuit 323 activates the booting enabling signal BTEN. The booting control circuit 323 accesses the programs stored in the ROM 350 through the switching circuit 325. Subsequently, the contents in the ROM 350 are moved to the main memory 330. When the contents in the ROM 350 are moved, the booting control circuit 323 inactivates the booting enabling signal BTEN, so that the peripheral control circuit 322 can communicate with the peripheral device 340 through the switching circuit 325.

Figure 4:
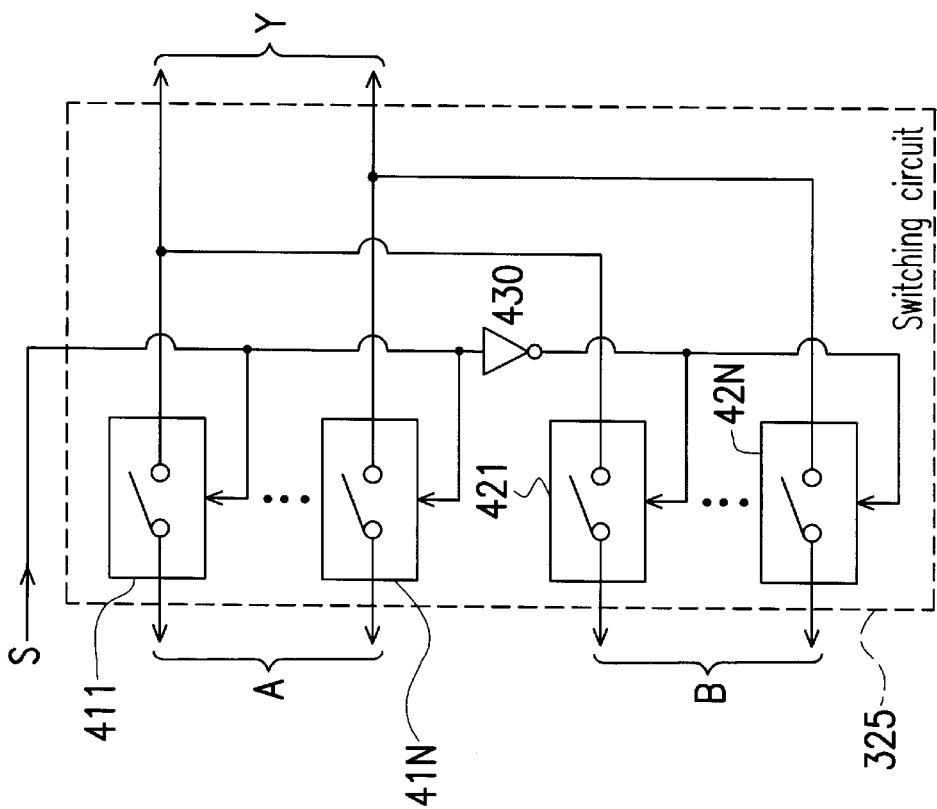
FIG. 4 is a block diagram of an implementation of the switching circuit in FIG. 3.

Refer to FIG. 4, where a block diagram of an implementation of the switching circuit 325 in FIG. 3 is shown. The switching circuit 325 comprises two sets of electronic switches, i.e., first electronic switches 411~41N and second electronic switches 421~42N. The first electronic switches 411~41N are controlled by a selection signal S and the second electronic switches 421~42N are controlled by an inverted signal of the selection signal S through an inverter 430. The first electronic switches 411~41N and second electronic switches 421~42N turn ON at different potential levels, respectively. For example, when the selection signal S is in the high level, the first electronic switches 411~41N turn ON, while the second electronic switches 421~42N turn OFF. On the other hand, when the selection signal S is in the low level, the first electronic switches 411~41N turn OFF, while second electronic switches 421~42N turn ON.

Figure 5:
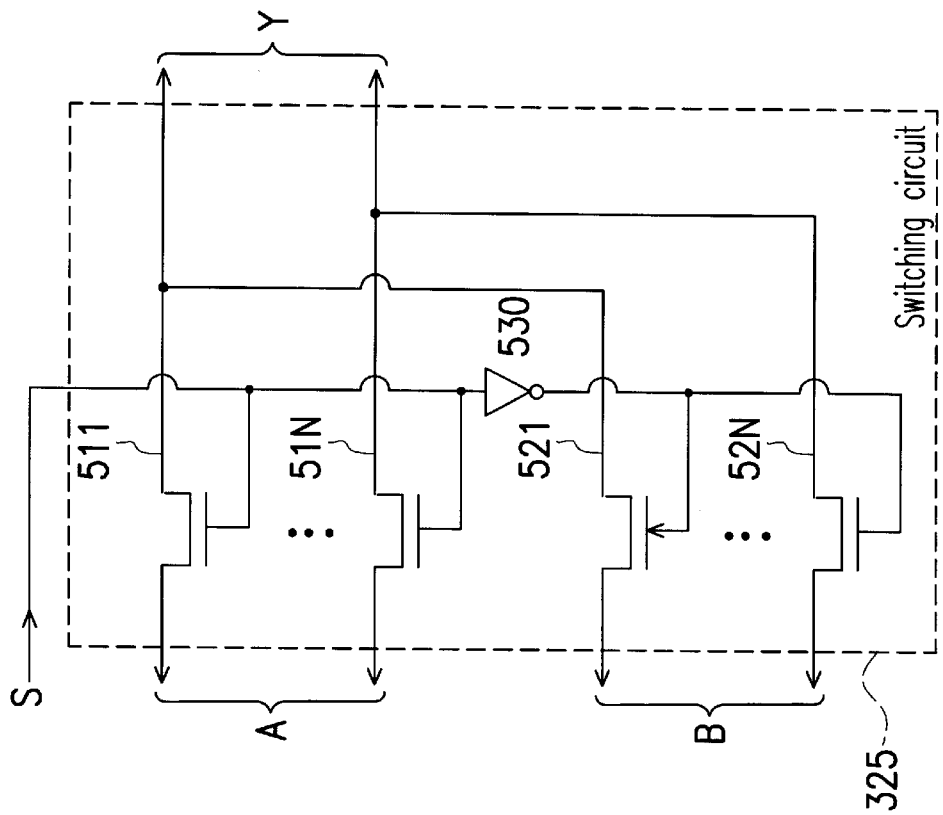
FIG. 5 is a circuit implementing the switching circuit in FIG. 3.

Refer to FIG. 5, where a circuit implementing the switching circuit 325 in FIG. 3 using MOSFET is shown, in which the switching circuit 325 is implemented by two sets of MOSFET switches. i.e., first MSOFET switches 511~51N and second MOSFET switches 521~52N. The first MOSFET switches 511~51N are controlled by a selection signal S and the second MOSFET switches 521~52N are controlled by an inverted signal of the selection signal S through an inverter 530. The first MOSFET switches 511~51N and second MOSFET switches 521~52N turn ON at different potential levels, respectively. For example, when the selection signal S is in the high level, the first MOSFET switches 511~51N turn ON, while the second MOSFET switches 521~52N turn OFF. On the other hand, when the selection signal S is in the low level, the first MOSFET switches 511~51N turn OFF, while the second MOSFET switches 521~52N turn ON.

Figure 6:
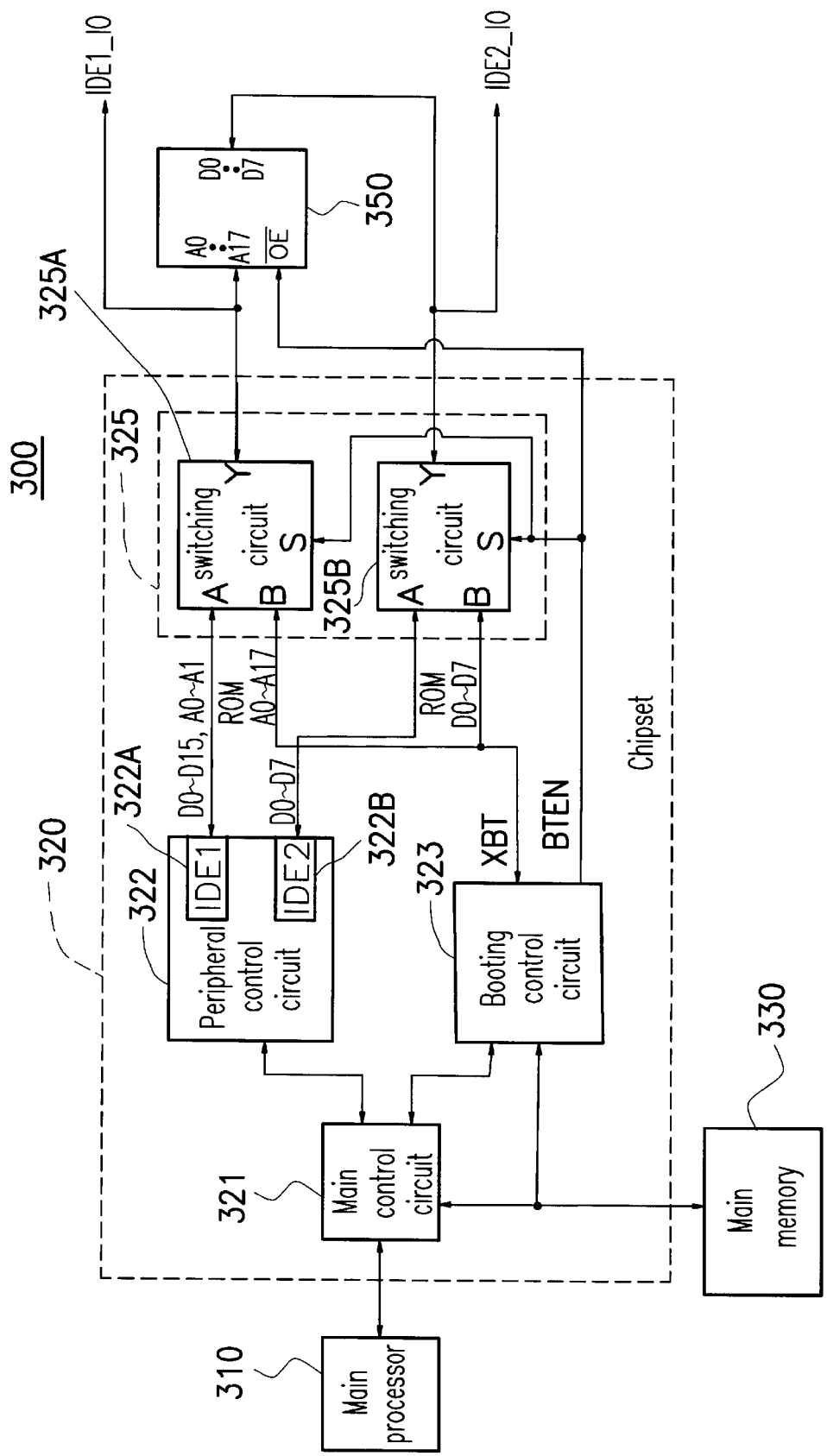
FIG. 6 is a block diagram of a computer system having a chipset to access a ROM by switching between a hard disk drive (HDD) control circuit and a booting control circuit.

Refer to FIG. 6, where a block diagram of a computer system having a chipset to access a ROM by switching between a hard disk drive (HDD) control circuits IDEI and IDE2 and a booting control circuit, is depicted. As shown in FIG. 6, address lines A0~A17 of the ROM 350 and data lines D0~D15 and address lines A0~A1 of the HDD control circuit IDEI share the same peripheral pins of the chipset 320, while data lines D0~D7 of the ROM 350 and data lines D0~D7 of the HDD control circuit IDE2 share the same peripheral pins of the chipset 320. For illustrating purpose, the switching circuit 325 is separated into switching circuits 325A and 325B, in which the switching circuit 325A is used to switch between the address lines of the ROM 350 and the signal lines of the HDD control circuit IDEI, while the switching circuit 325B is used to switch between the data lines of the ROM 350 and the data lines of the HDD control circuit IDE2.

As shown in FIG. 6, when the computer system 300 is turned ON, the booting control circuit 323 activates the booting enabling signal BTEN to access the booting programs stored in ROM 350 through the switching circuits 325A and 325B. Contents in the ROM 350 are also moved to the main memory 330 after the computer system 300 is booted. When the contents in the ROM 350 are moved, the booting control circuit 323 inactivates the booting enabling signal BTEN. The HDD control circuits IDE1 and IDE2 in the peripheral control circuit 322 are then connected to external ports IDE1_IO and IDE2_IO connecting HDDs or other peripheral devices through the switching circuits 325A and 325B.

Figure 7:
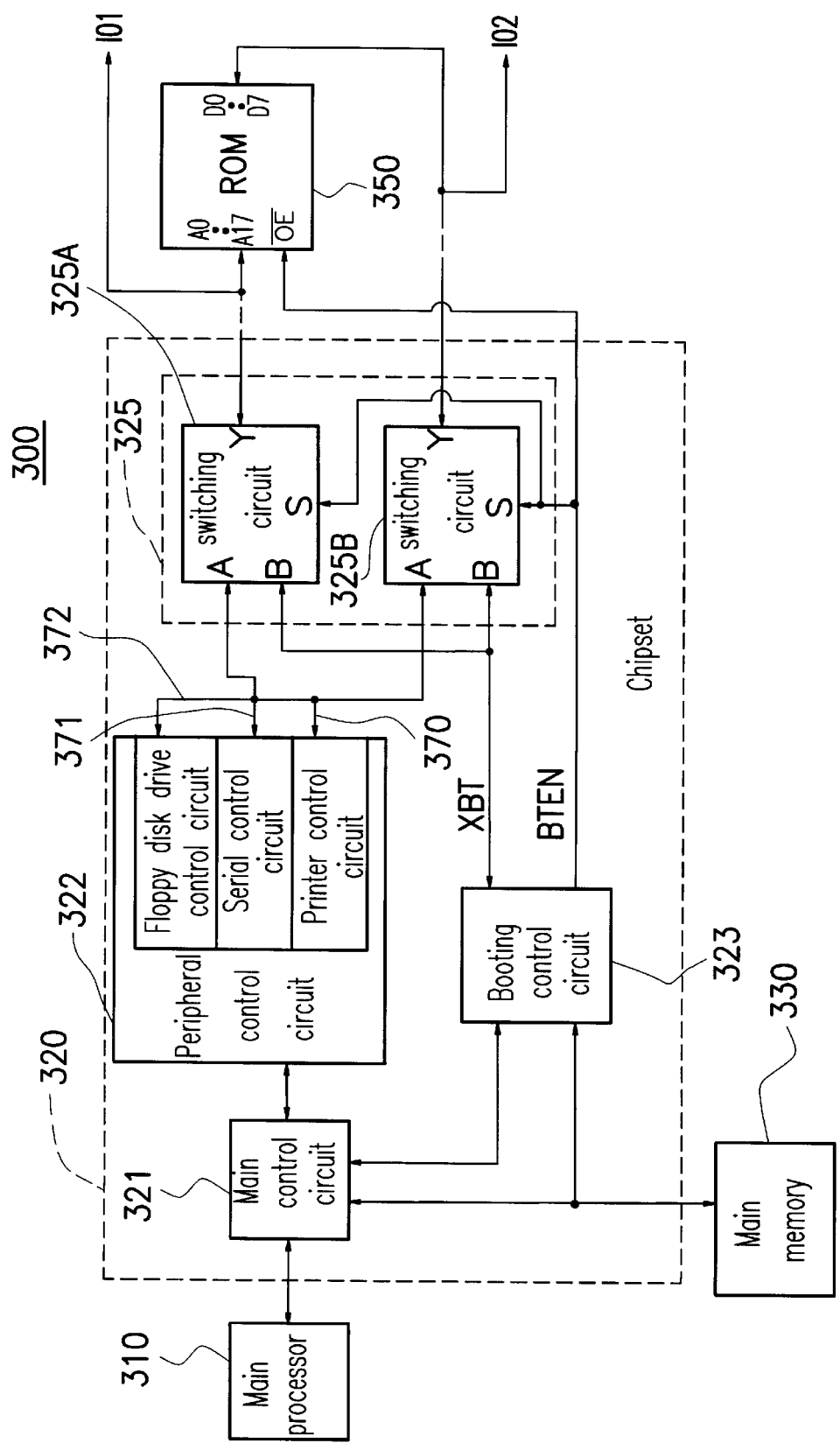
FIG. 7 is a block diagram of a computer system having a chipset to access a ROM by switching between peripheral control circuits of a floppy disk drive (FDD) control circuit, a serial control circuit, and a printer control circuit and a booting control circuit.

In addition to the HDD control circuit, the chipset might comprise other peripheral control interfaces, such as a printer control circuit, a serial control circuit, a floppy disk drive control circuit, a LPC interface circuit, etc. Therefore, the contents of the ROM 350 can also be accessed through these interface circuits. As shown in FIG. 7, a block diagram of a computer system having a chipset to access a ROM by switching between peripheral control circuits of a floppy disk drive (FDD) control circuit a serial control circuit, and a printer control circuit and a booting control circuit, is depicted. Referring to FIG. 7, data lines PD0~PD7 of the printer control circuit lines 370 and data lines D0~D7 of the ROM 350 share the same peripheral pins of the chipset 320. Signal lines RTS1 RTS2, DTR1, DTR2, TXD1, and TXD2 of the serial control circuit lines 371 and signal lines DRVD-EN0, DRVD-1, $\overline{\text{MTRO}}$, $\overline{\text{MTR1}}$, $\overline{\text{DS0}}$, $\overline{\text{DS1}}$, $\overline{\text{STEP}}$, $\overline{\text{WDATA}}$, $\overline{\text{WGATE}}$, and $\overline{\text{HDSEL}}$, of the floppy disk drive control circuit lines 372, as well as signal lines $\overline{\text{SLETIN}}$ and $\overline{\text{INIT}}$ of the printer control circuit lines 370 and address lines A0~A17 of the ROM 350 share the same peripheral pins of the chipset 320.

Figure 8:
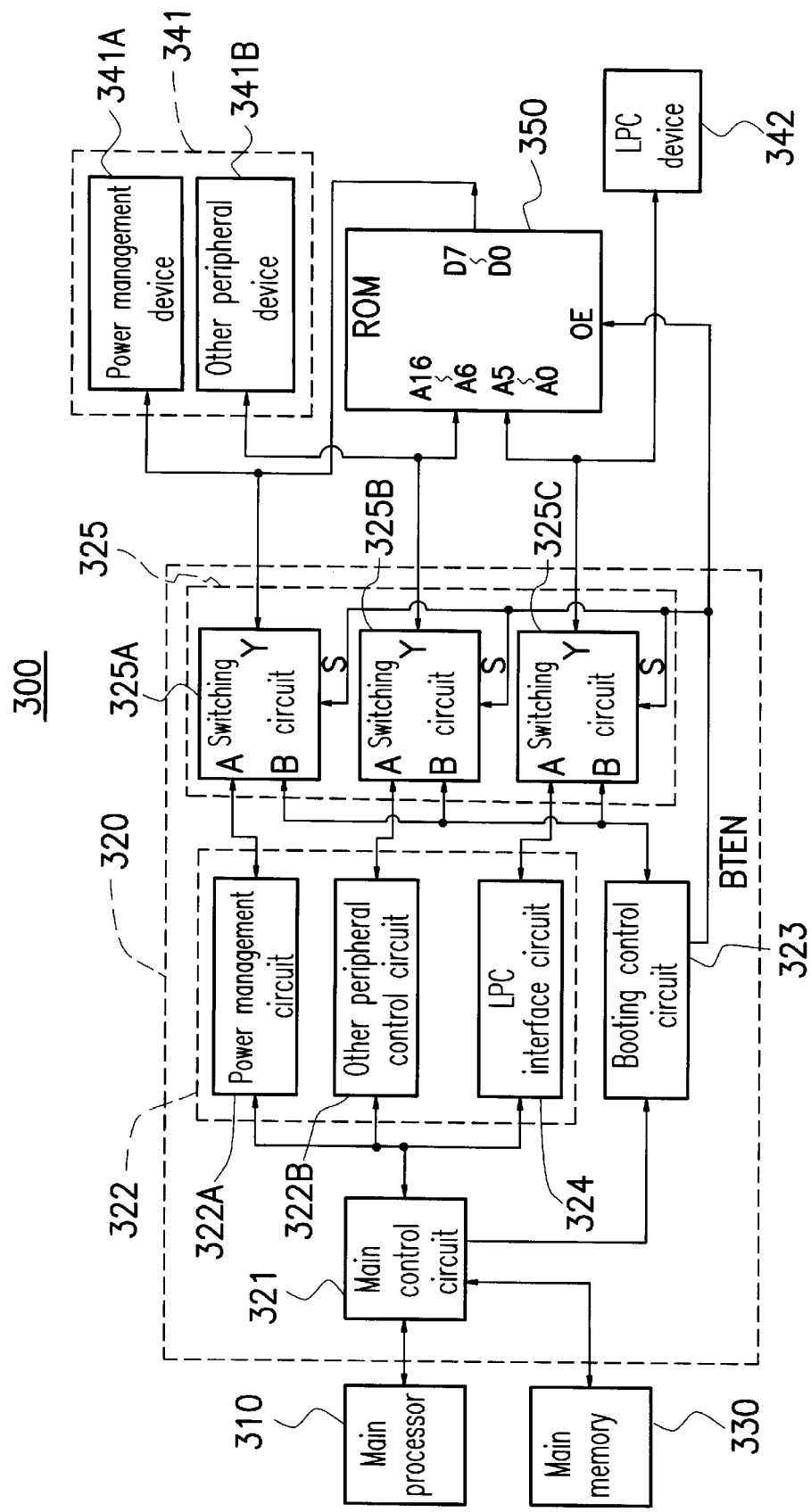
FIG. 8 is a block diagram of a computer system having a chipset to access a ROM by switching between peripheral control circuits of a LPC interface circuit, a power management circuit, and other peripheral control circuit and a booting control circuit.

If a LPC interface circuit built within the peripheral control circuit of the chipset is to be used, together with other peripheral interface circuits, the contents of a ROM can be accessed without using the conventional ISA interface circuit. Refer to FIG. 8, where a block diagram of a computer system 300 having a chipset 320 to access a ROM 350 by switching between peripheral control circuit 322 of a LPC interface circuit 324, a power management circuit 322A, and other peripheral control circuit 322B and a booting control circuit 323, is depicted according to a preferred embodiment of the present invention. As shown in FIG. 8, the ROM 350 has 17 address lines and 8 data lines, but the LPC interface circuit 324 has only 8 signal lines. It is therefore required to use the signal lines of the power management circuit 322A and other peripheral control circuit 322B within the peripheral control circuit 322 to provide a sufficient number of signal lines. The switching circuit 325 is separated into switching circuits 325A, 325B, and 325C to facilitate the access to the ROM 350. In this preferred embodiment, 6 signal lines of the LPC interface circuit 324 and 6 signal lines of the booting control circuit 323 share the same peripheral pins of the chipset 320 as the address lines A0~A5 to access the ROM 350 through the switching circuit 325C. 11 signal lines of the other peripheral circuit 322B and 11 address lines of the booting control circuit 323 share the same peripheral pins of the chipset 320 as address lines A6~A16 to access the ROM 350 through the switching circuit 325B. Data lines D0~D7 of the power management circuit 322A and data lines D0~D7 of the booting control circuit 323 share the same peripheral pins of the chipset 320 as the data lines D0~D7 to access the ROM 350. An output enabler OE of the ROM 350 receives a booting enabling signal BTEN from the booting control circuit 323. When the booting enabling signal BTEN is activated, for example, at a low potential, the ROM 350 can be accessed by the address lines A0~A16 to retrieve data through the data lines D0~D7 from the ROM 350.

As shown in FIG. 8, when the computer system 300 is turned ON, the booting control circuit 323 activates the booting enabling signal BTEN, so that the input-output ports B of the switching circuits 325A, 325B, and 325C are connected to input-output ports Y. Therefore, the booting control circuit 323 can access the ROM 350 using the address lines A0~A16 through the switching circuits 325B and 325C, and retrieves data from the ROM 350 through data lines DOD7 via the switching circuit 325A. Consequently, the contents of the ROM 350 can be moved to the main memory 330 in this way. Furthermore, when the contents in the ROM 350 are moved, the booting control circuit 323 inactivates the booting enabling signal BTEN, so that the power management circuit 322A, the other peripheral circuit 322B, and the LPC interface circuit 324 can communicate with the power management device 341A, the other peripheral device 341B, and the LPC device 342 through the switching circuits 325A, 325B, and 325C, respectively.

The above-mentioned embodiments of the present invention use the HDD control circuit, FDD control circuit, LPC interface circuit, power management circuit, and other peripheral control circuit, which share the same peripheral pins of the chipset to access the ROM. However, the present invention is not limited to the above-mentioned peripheral control circuits only. In a practical circuit design, available peripheral control circuits can also be considered to achieve this objective of accessing the ROM and moving the contents stored in the ROM to the main memory. Of course, some changes need to be made in the circuits within the chipset 320.

As a summary, the chipset having reduced peripheral pins for accessing a conventional ROM according to the preferred embodiments of the present invention has the following advantages:

1. The booting programs for a computer system can still be stored in conventional ROMs, which can be accessed by a chipset without an ISA interface in the computer system. Peripheral pins saved because ISA interface is no longer required in the chipset can provide more functions so that the functionality of the computer system is enhanced.

2. Although a chipset with a LPC interface circuit can access ROMs having a LPC interface, conventional ROMs are nevertheless considered if costs are taken into account, especially during the product transition period. Decision can be made to use conventional ROMs or ROM having LPC interface, depending on the which one is more advantageous to reduce the production cost and enhance product completeness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer chipset for accessing a ROM in a computer system, wherein the computer system comprises a main processor, a main memory, a ROM, and a peripheral device, wherein the computer chipset comprises:

a peripheral control circuit to control the peripheral device;

a booting control circuit, which generates a booting enabling signal to control the access to the ROM;

a switching circuit having a first input-output port, a second input-output port, and a third input-output port; wherein the first input-output port is coupled to the peripheral control circuit, the second input-output port is coupled to the booting control circuit, and the third input-output port is coupled to the peripheral device and the ROM, wherein the switching circuit is controlled by the booting enabling signal so that either the first input-output port or the second input-output port is connected to the third input-output port, wherein the second input-output port is connected to the third input-output port when the booting enabling signal is activated and the input-output port is connected to the third input-output port when the booting enabling signal is inactivated; and a main control circuit connected to both the main processor and the main memory, wherein the main control circuit controls the peripheral control circuit and the booting control circuit; wherein the booting control circuit activates the booting enabling signal when the computer system is turned on, so that contents stored in the ROM can be accessed and moved to the main memory through the switching circuit, wherein the booting control circuit inactivates the booting enabling signal when the contents stored in the ROM are to the main memory so that the peripheral control circuit can communicate with the peripheral device.

2. The computer chipset of claim 1, wherein the ROM comprises an output enabler connecting the booting enabling signal, wherein the ROM can be accessed when the booting enabling signal is activated.

3. The computer chipset of claim 1, wherein the switching circuit comprises a plurality of first electronic switches and a plurality of second electronic switches, wherein the first input-output port is connected to the third input-output port through the first electronic switches, and the second input-output port is connected to the third input-output port through the second electronic switches, wherein the first electronic switches are OFF and the second electronic switches are ON when the booting enabling signal is activated, wherein the first electronic switches are ON and the second electronic switches are OFF, when the booting enabling signal is inactivated.

4. The computer chipset of claim 3, wherein each of the first electronic switches is a metal oxide semiconductor (MOS) field effect transistor (FET).

5. The computer chipset of claim 1, wherein the peripheral control circuit comprises a hard disk drive (HDD) control circuit.

6. The computer chipset of claim 1, wherein the peripheral control circuit comprises a serial control circuit, a printer control circuit, a floppy disk drive (FDD) control circuit, and a low pin count (LPC) interface circuit.

7. The computer chipset of claim 1, wherein the booting control circuit comprises an industrial standard adapter (ISA) interface circuit.

8. The computer chipset of claim 3, wherein each of the second electronic switches is a metal oxide semiconductor (MOS) field effect transistor (FET).

9. A computer chipset for accessing a ROM in a computer system, comprising:
a peripheral control circuit to control a peripheral device in the computer system;
a booting control circuit, which generates a booting enabling signal to control the access to the ROM;
a switching circuit having a first input-output port, a second input-output port, and a third input-output port; wherein the first input-output port is coupled to the peripheral control circuit, the second input-output port is coupled to the booting control circuit, and the third input-output port is coupled to the peripheral device and the ROM, wherein the switching circuit is controlled by the booting enabling signal so that either the first input-output port or the second input-output port is connected to the third input-output port, wherein the second input-output port is connected to the third input-output port when the booting enabling signal is activated and the first input-output port is connected to the third input-output port when the booting enabling signal is inactivated; wherein the booting control circuit activates the booting enabling signal when the computer system is turned on, so that contents stored in the ROM can be accessed and moved to a main memory through the switching circuit, wherein the booting control circuit inactivates the booting enabling signal when the contents stored in the ROM are moved to the main memory so that the peripheral control circuit can communicate with the peripheral device.

10. The computer chipset of claim 9, wherein the computer chipset further comprises a main control circuit responsible for the controlling operations of the computer chipset, wherein the main control circuit is connected to a main processor, the main memory, the peripheral control circuit, and the booting control circuit.

11. The computer chipset of claim 9, wherein the ROM comprises an output enabler connecting the booting enabling signal, wherein the ROM can be accessed when the boinnabling signal is activated.

12. The computer chipset of claim 9, wherein the switching circuit comprises a plurality of first electronic switches anta plurality of second electronic switches, wherein the first input-output port is connected to the third input-output port through the first electronic switches, and the second input-output port is connected to the third input-output port through the second electronic switches, wherein the first electronic switches are OFF and the second electronic switches are ON when the booting enabling signal is activated, wherein the first electronic switches are ON and the second electronic switches are OFF, when the booting enabling signal is inactivated.

13. The computer chipset of claim 12, wherein each of the first electronic switches is a metal oxide semiconductor (MOS) field effect transistor (FET).

14. The computer chipset of claims 9, wherein the peripheral control circuit comprises a hard disk drive (HDD) control circuit.

15. The computer chipset of claim 9, wherein the peripheral control circuit comprises a serial control circuit, a printer control circuit, a floppy disk drive (FDD) control circuit, and a low pin count (LPC) interface circuit.

16. The computer chipset of claim 9, wherein the booting control circuit comprises an industrial standard adapter (ISA) interface circuit.

17. The computer chipset of claim 12, wherein each of the second electronic switches is a metal oxide semiconductor (MOS) field effect transistor (FET).

* * * * *